Jan. 27, 1948.    R. M. BEATTY    2,435,067
ANTIFRICTION BEARING MOUNTING
Filed Oct. 18, 1946

INVENTOR
Rolla M. Beatty
BY William B Jaspert
ATTORNEY

Patented Jan. 27, 1948

2,435,067

UNITED STATES PATENT OFFICE 2,435,067

ANTIFRICTION BEARING MOUNTING

Rolla M. Beatty, Pittsburgh, Pa.

Application October 18, 1946, Serial No. 704,224

2 Claims. (Cl. 308—236)

This invention relates to new and useful improvements in mounting antifriction bearings, and it is among the objects thereof to provide means for mounting antifriction bearings to prevent creeping of the bearing races.

It is a further object of the invention to provide means for mounting antifriction members by locking the outer bearing race in permanent and fixed position in the bearing housing.

Figure 2:
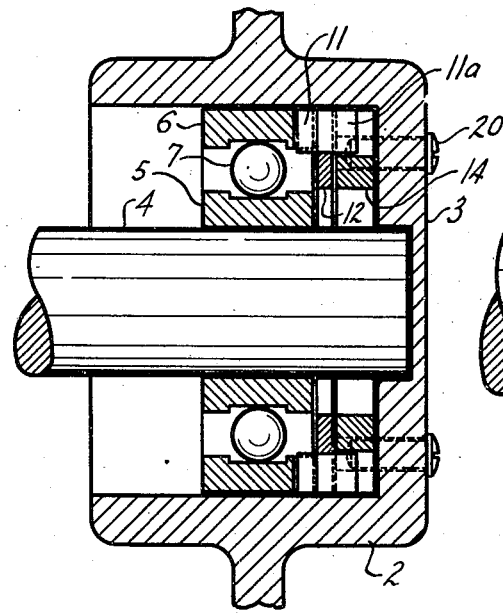
Figure 1:
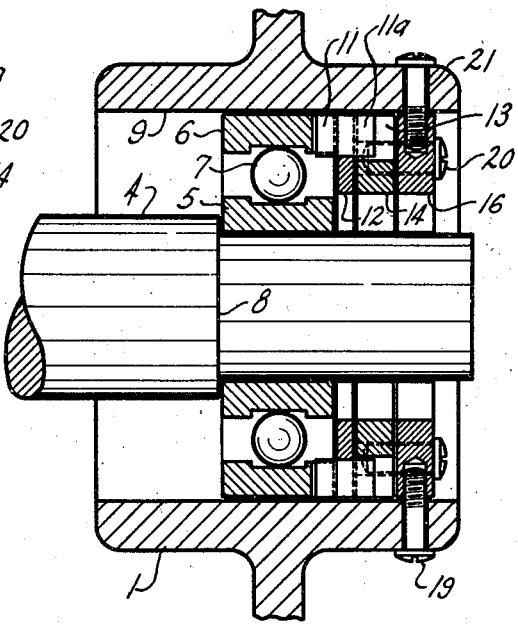
Figure 3:
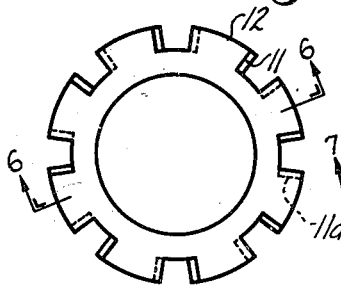
Figure 4:
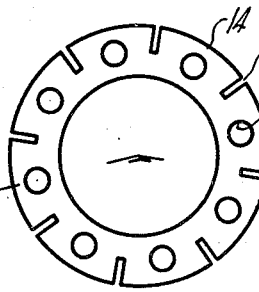
Figure 5:
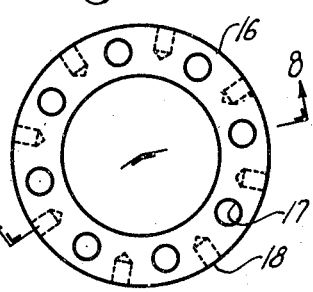
Figure 6:
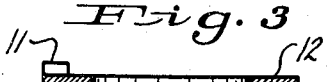
Figure 7:
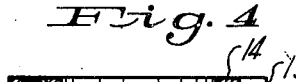
Figure 8:
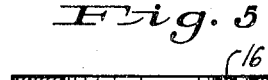
Figure 9:
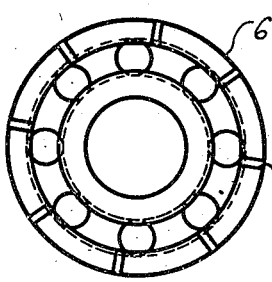
Figure 10:
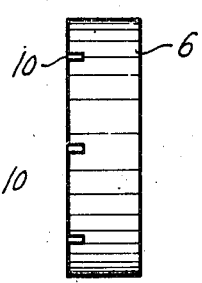

These and further objects of the invention will become more apparent from a consideration of the accompanying drawing, constituting a part hereof, in which like reference characters designate like parts, and in which Fig. 1 is a vertical cross-sectional view, partially in elevation, of a bearing member embodying the principles of this invention;

Fig. 2 a similar view of a modified form of bearing structure;

Figs. 3, 4 and 5 plan views of locking discs embodying the principles of this invention;

Figs. 6, 7 and 8 cross-sectional views, taken, respectively, on the line 6—6 Fig. 3, 7—7 Fig. 4, and 8—8, Fig. 5; and Figs. 9 and 10 a side and front elevational view, respectively, of an antifriction bearing member.

With reference to the several figures of the drawing, the numeral 1 designates a bearing housing of a motor or transmission, as the case may be, 2 a similar housing having an end wall 3. Shafts 4 are adapted to be journaled in the bearing housings by antifriction members constituting an inner race 5 and an outer race 6 with antifriction ball bearings 7 disposed therebetween. As is conventional practice, the inner race 5 is mounted on or near the end of the shaft or against a shoulder 8 of the shaft by a press fit, the inner race turning with the shaft 4 as it rotates. The outer race 6 is usually pressed into the cylindrical wall 9 of the bearing housing and is entirely dependent upon its press fit against rotation. Due to the vibration of the machine in which the antifriction bearings are mounted, the outer race usually becomes loose and begins rotating with the shaft 8, which results in pitting and destruction of the outer surface of the outer race member with increased vibration and ultimate destruction of the bearing housing itself.

In accordance with the present invention the outer bearing race 6 is locked against rotation irrespective of a loose or tight fit in the wall of the bearing housing so that the life of the bearing is greatly increased. This is accomplished by means of the locking rings, shown in Figs. 3 to 8 of the drawings, which are constructed as follows.

The outer bearing race 6 is provided with radial slots 10, Figs. 9 and 10, which are adapted to receive lugs or ears 11 of the locking ring 12. It is to be noted that the ring 12 has oppositely disposed ears or lugs 11 or 11a which not only interact with slots 10 of the outer race, but on the opposite face of the ring 12 interact with slots 13 of locking rings 14 that are provided with perforations 15. Another locking ring 16, Fig. 5, is provided with perforations or openings 17 that correspond in number and spacing to the openings 15 of the lock ring 14. Also the lock ring 16 is provided with radial drill holes or tap holes 18 for receiving screws 19, as shown in Fig. 1.

The parts are assembled as follows. The inner race 5 of the bearing having been pressed on the end of the shaft 4 and the outer race and antifriction ball bearing members being in a unit assemb'y with the inner race 5, the shaft is placed in the bearing housing 1 or 2, as shown in Figs. 1 or 2 of the drawing. The locking ring 12 is then assembled with the lugs 11 inserted in slots 10 of the outer race 6. The intermediate lock ring 14 is then mounted adjacent the face of lock ring 12 with the lugs 11a disposed in slots 13 thereof, and the outer lock ring 16 is then placed against the face of ring 14, as shown in Fig. 1, and screws 20 are inserted through openings 17 and 15, the latter being a tap hole, to hold the members 14 and 16 together. Screws 19 are then disposed through openings 21 of the housing 1 and interact with the threaded openings 18 of the outer lock ring. In this manner the intermediate ring 14 is locked against rotation by pins 19 and 20 and the lock ring 12 is interlocked through slots 13 of ring 14 and thereby interlocks the outer race 6 by engagement of the lugs 11 with the slots 10.

By means of this construction the outer race is prevented against rotating and is secured against vibration, thereby adding to the life of the bearing and the bearing housing.

In the form of the device shown in Fig. 2, the end lock ring 16 may be omitted and the lock rings 12 and 14 alone are used because the end wall 3 of the bearing housing serves as the anchor for preventing rotation of the locking means, taking the place of the end ring 16. Otherwise the lock ring 12 interacts through the lugs 11 with the slots 10 of the outer bearing race and through lugs 11a with the slots 13 of the intermediate race 14. The latter is locked with the end wall 3 of the bearing housing by the tap screws 20 which interact with the threaded opening 15 of the member 14.

It is evident from the foregoing description of the invention that a bearing locking means as therein disclosed prevents rotation of the outer bearing race which is securely and permanently held in fixed position with the bearing housing. The invention is of course applicable to both the roller and ball type of antifriction bearings in which the bearing members are interposed between an inner and outer race.

Although one embodiment of the invention has been herein illustrated and described, it will be evident to those skilled in the art that various modifications may be made in the details of construction without departing from the principles herein set forth.

I claim:

1. An antifriction bearing structure comprising an inner race mounted for rotation with a shaft, an outer race and antifriction bearings disposed between the inner and outer races, said outer race having radial slots on one face thereof, a lock ring having ears or lugs disposed on opposite faces thereof for interacting with the slots of said outer race, and a second lock ring having slots for engaging the oppositely disposed lugs of said first named lock ring, and means for anchoring said second named lock ring to the bearing housing.

2. In an antifriction bearing for high speed revolving shafts, an inner race mounted for rotation with said shaft, an outer race, and antifriction members disposed between said races, said outer race being disposed in a bearing housing, a plurality of lock rings for locking said outer race in said housing, said outer race having radial slots, one of said lock rings having similar slots, and an intermediate lock ring having oppositely disposed lugs for interacting with the slots of the outer race and slotted lock ring, and a third lock ring having fastening means connected with the said lock ring to prevent rotation thereof and having means for securing the last named lock ring against rotation in said bearing housing.

ROLLA M. BEATTY.